C. G. KLEINSCHMIDT.
WHEEL RIM FOR PNEUMATIC TIRES.
APPLICATION FILED JUNE 1, 1911.

1,021,783.

Patented Apr. 2, 1912.
2 SHEETS—SHEET 1.

Witnesses
Katherine Koch
Daniel Holmgren

Inventor:
Carl Georg Kleinschmidt
by Briesen & Knauth Att'ys

C. G. KLEINSCHMIDT.
WHEEL RIM FOR PNEUMATIC TIRES.
APPLICATION FILED JUNE 1, 1911.

1,021,783.

Patented Apr. 2, 1912.
2 SHEETS—SHEET 2.

Witnesses:
Katheryne Koch
Daniel Holmgren

Inventor
Carl Georg Kleinschmidt
by Briesen & Gumpe Attys.

UNITED STATES PATENT OFFICE.

CARL GEORG KLEINSCHMIDT, OF HERNE, GERMANY.

WHEEL-RIM FOR PNEUMATIC TIRES.

1,021,783.            Specification of Letters Patent.            Patented Apr. 2, 1912.

Application filed June 1, 1911. Serial No. 630,654.

*To all whom it may concern:*

Be it known that I, CARL GEORG KLEINSCHMIDT, engineer, residing at Siepenstrasse 19, Herne, in Westphalia, Germany, have invented a certain new and useful Improvement in Wheel-Rims for Pneumatic Tires, of which the following is a specification.

This invention relates to wheel rims of the separable type and consists, firstly, in using in combination with two rim-members placed side by side, a split locking ring which clamps the edges of the pneumatic tire cover and at the same time engages the two rim members, and thereby locks them together.

Another part of the invention consists in a device for tightening up and fastening the said locking ring.

The invention is illustrated in the accompanying drawing, in which—

Figure 1:
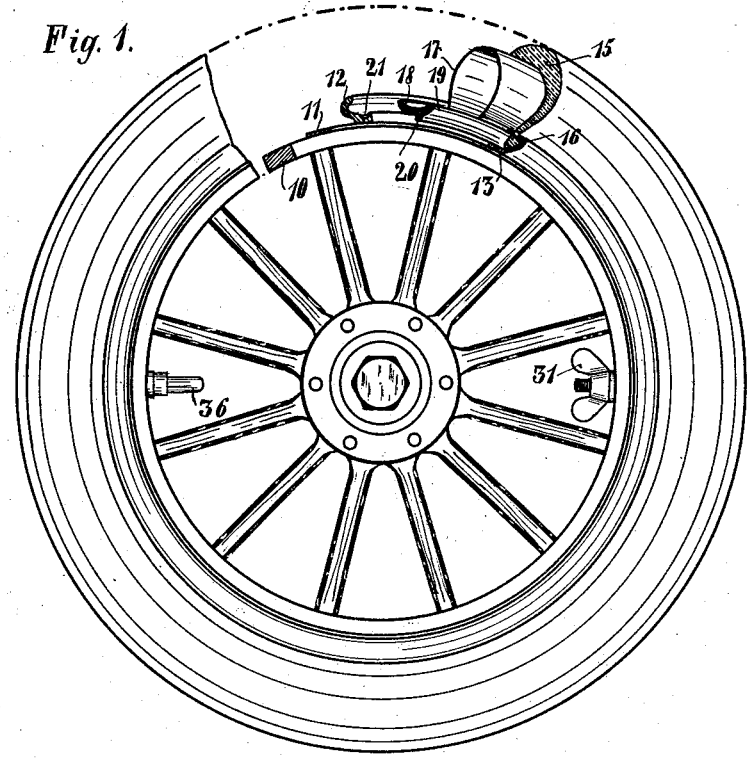
Figure 2:
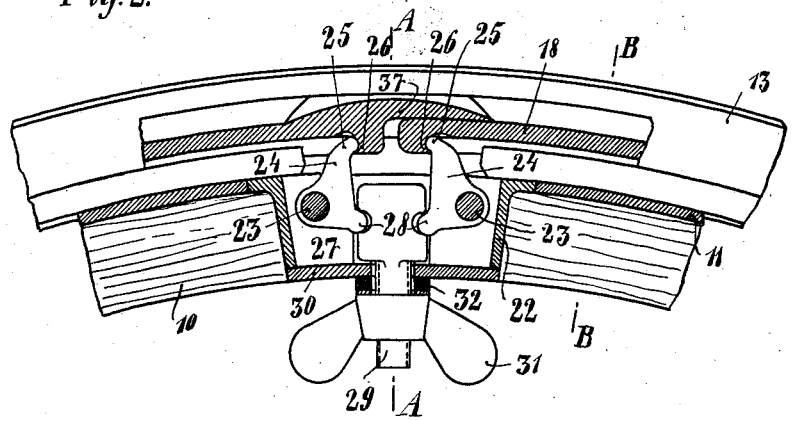
Figure 3:
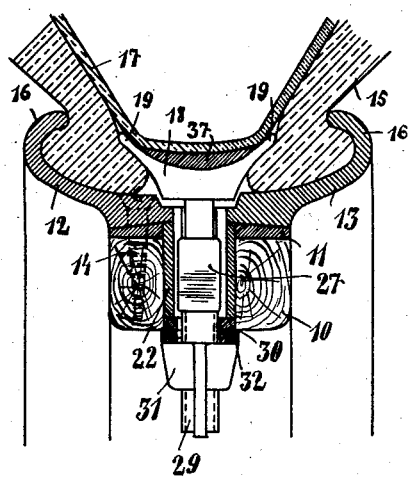
Figure 4:
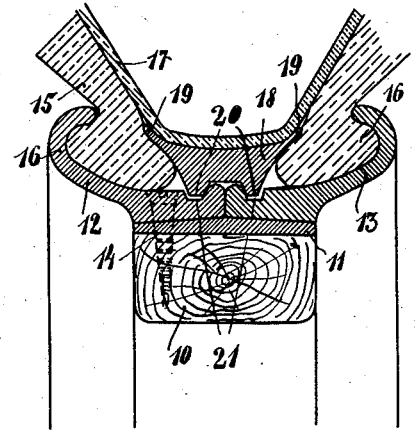
Figure 5:
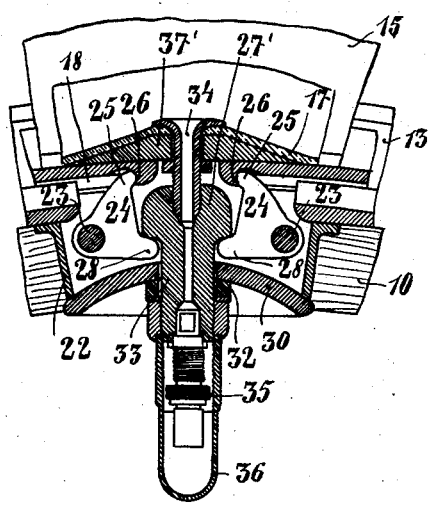
Figure 6:
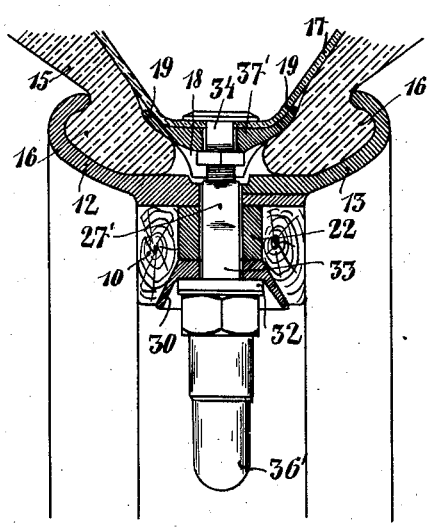

Figure 1 is an elevation of a wheel with the improved rim with portions of the latter and the tire being cut away; Fig. 2 shows the fastening device on a larger scale, partly in section, Fig. 3 is a section on the line A—A of Fig. 2, and Fig. 4 a section on the line B—B of the same figure; Figs. 5 and 6 are respectively a longitudinal section and a cross-section showing a modification of the fastening device.

Like reference numerals denote like or corresponding parts throughout the drawing.

In the drawing, 10 represents a felly made of wood or other material, with a ring 11 thereon, the outer surface of said ring being slightly coned, to slope away from the median line and form two conical seats for the symmetrical rim members 12 and 13. The ring 11 and member 12 are permanently attached to the wooden felly 10 by screws 14. The beads 16 of the outer tire cover 15 are engaged by the inwardly curved edge portions of the members 12 and 13.

Surrounding the air tube 17 and intermediate of the edges of the tire cover 15 there is a ring 18 which may be made in one part or several parts and has lateral flanges 19 bearing upon the inner edges of the cover 15. Said ring 18 also has ribs 20 engaging outer grooves in the members 12 and 13, so that the latter are locked together by the ring 18. To prevent binding, by rust, the parts 11 and 18 are preferably made of a material different from the material of the parts 12 and 13 for example of Delta metal or other alloy, the parts 12 and 13 being of steel.

Instead of a cover with beads 16, as shown, some other known kind of cover may be used, for example a wired cover.

Instead of having separate parts 12 and 11, the same may be combined as shown in Fig. 6, but this involves loss of the advantage of having two symmetrical members 12 and 13 and of being able to use different materials, as described.

At the place where the locking ring 18 is split the felly 10 has an aperture, forming a chamber 22 wherein two locking members 24 are pivoted upon pins 23, said members 24 having projections 25 which engage with inwardly directed, hook-like flanges of the ring 18. A radially slidable piece 27 inserted into the chamber 22 is grooved for engagement with projections 28 of the members 24, so that by inward movement of the piece 27 the outer ends of the members 24 are rocked toward each other, like the jaws of a pair of pincers, and draw together the ends of the ring 18. The slide 27 has a screw-threaded projection 29, which passes through the floor 30 of the chamber 22, and upon which a wing nut is screwed outside said chamber, an elastic washer 32 being interposed to make a water-tight joint. The ring 18 has a fixed tongue 37, which makes a tight lap joint at the part where the ring is split, without interfering with the contraction of the ring.

In the modification shown in Figs. 5 and 6 the tire valve provided in the felly 10 is made in one with the fastening device. The stem 33 of the valve, screwed to the tube 34 leading to the inner air tube, has an enlargement or head 27′ for engagement with the projections 28 of the locking members 24. A bridge piece 37′ traversed by the tube 34 is placed over the gap between the ends of the locking ring 18, as a support for the airtube wall over said gap. The stem 33 is joined to the nipple 35, which is protected by a cap 36.

The arrangement described, which may be modified in detail within the scope of the subjoined claims, has important advantages over the rims of this class previously designed. The dual function of the locking ring, consisting in fastening the cover and locking the rim members, reduces the number of parts. The pressure of the inflated tire assists the locking action and prevents looseness. Renewal of the tire cam be effected in a simple and expeditious manner. For this purpose the nut 31 is unfastened, and the screw 29 thrust outward, so that the elastic ring 18 can expand sufficiently to withdraw the ribs 20 from engagement with the members 12 and 13. The member 13 is then removed, with the damaged tire. The cover of the new tire is first engaged with the member 12, and the air tube and ring 18 are placed in position, whereupon the member 13 is pushed on to the ring 11, and the ring 18 is locked. The member 12, which remains attached, forms a convenient abutment and holder for the heavy, unyielding tire during this operation. The axle is of course jacked up, so that the wheel can revolve. The inflation of the tire compresses the locking ring, so that the fastening device can easily be tightened up.

The fastening device is very convenient, as the ring 18 can easily be engaged with the members 24. The force exerted, for fastening, acts quite uniformly on the two ends of the ring 18.

The device is very compact, and the small chamber required therefore does not materially weaken the wheel.

With the construction shown in Figs. 5 and 6 the valve, which must in any case be unfastened when exchanging the tire is removed and replaced by the operations which unfasten and fasten the tire and the rim.

What I claim as my invention and desire to secure by Letters Patent of the United States is:—

1. A device of the character described, comprising a pair of rim members having outer grooves, a tire cover engaged by said members, and a locking ring interposed between the edges of said cover and having laterally extending flanges that overlie said cover and inwardly extending ribs that engage the rim-grooves.

2. A device of the character described, comprising a pair of rim members having outer grooves, a tire cover engaged by said members, a split locking ring interposed between the edges of said cover and having flanges that engage the cover and ribs that engage the rim grooves, and coupling means for detachably connecting the ends of the locking ring.

3. In a vehicle wheel, the combination of a rim composed of two parallel separable rim members, with an outer tire cover having its edges engaged with the said rim members, an inner air tube and a transversely split locking ring which is placed between said air tube and rim members and having flanges holding the edges of the cover and internal projections engaging said rim members, together with pivoted locking members in the felly, having projections engaging the transverse edges of the locking ring, at the split part and a radial screw device for rocking said locking members toward each other.

CARL GEORG KLEINSCHMIDT. [L. S.]

Witnesses:
ALFRED HENKEL,
ALBERT F. NUFER.

---

Copies of this patent may be obtained for five cents each, by addressing the "Commissioner of Patents, Washington, D. C."